United States Patent [19]
Dogul et al.

[11] Patent Number: 5,559,664
[45] Date of Patent: Sep. 24, 1996

[54] ELECTROMECHANICAL RELAY SYSTEM

[75] Inventors: James Dogul, Hudson, N.H.; Sandip Sarkar, North Providence, R.I.; Frederick Thomson, Cumberland, R.I.; Robert Thomson, Warwick, R.I.

[73] Assignee: Frost Controls, Inc., Smithfield, R.I.

[21] Appl. No.: 73,096

[22] Filed: Jun. 7, 1993

Related U.S. Application Data

[62] Division of Ser. No. 755,566, Sep. 5, 1991, Pat. No. 5,218, 196.

[51] Int. Cl.$^6$ .................................................. G01V 9/04
[52] U.S. Cl. ........................... 361/191; 361/160; 361/154
[58] Field of Search ..................... 361/191, 160, 361/139, 154, 192, 183, 72; 250/221, 221.1, 222.2, 223 R; 340/556, 555, 557; 307/99, 328, 326, 132 E, 132 EA, 141.8, 113–114, 88; 324/415, 418, 419, 420–422

[56] References Cited

U.S. PATENT DOCUMENTS

| | | | |
|---|---|---|---|
| 4,217,534 | 8/1980 | Cole | 320/25 |
| 4,249,074 | 2/1981 | Zettler et al. | 250/221 |
| 4,266,124 | 5/1981 | Weber et al. | 250/221 |
| 4,309,696 | 1/1982 | Nagai et al. | 340/515 |
| 4,317,604 | 3/1982 | Krakauer | 312/97.1 |
| 4,507,702 | 3/1985 | Grene | 361/161 |
| 4,724,505 | 2/1988 | Gelbort | 361/167 |
| 5,000,692 | 3/1991 | Taniguichi et al. | 439/160 |
| 5,015,840 | 5/1991 | Blau | 250/221 |
| 5,149,921 | 9/1992 | Picado | 187/130 |

OTHER PUBLICATIONS

High Speed Multi–Contact Lockout Relays Apr. 15, 1987.

*Primary Examiner*—Peter S. Wong
*Assistant Examiner*—Aditya Krishnan
*Attorney, Agent, or Firm*—Thomas L. Bohan; Chris A. Caseiro

[57] ABSTRACT

A photodetection system and related circuitry designed to sense the intrusion of an opaque object in a light plane. Upon sensing the intrusion, the system quickly initiates a machine-stopping sequence prior to the opaque object coming into contact with the machine while that machine is operating. The system comprises a SYSTEM microcontroller and a WATCHDOG microcontroller, both of which operate an output control device of the light curtain switch of the invention, wherein the output control device comprises a plurality of electromechanical relays. Both microcontrollers also perform system hardware and software integrity checks. Furthermore, the WATCHDOG microcontroller evaluates the performance of the SYSTEM microcontroller by transmitting a false intrusion signal to a photosource, determining whether the false signal has been detected, and then verifying that the SYSTEM microcontroller has initiated the machine-stopping sequence. The machine-stopping sequence may be overridden by the WATCHDOG microcontroller, or it may be initiated if the false signal is not detected. The combination of electronic, mechanical, and optical modules of the present invention provides improved reliability and accuracy. In addition, the SYSTEM microcontroller and the WATCHDOG microcontroller are designed so as to reduce the system's sensitivity to spurious signals.

23 Claims, 5 Drawing Sheets

ELECTROMECHANICAL RELAY SYSTEM

This is a division of application Ser. No. 7/755,566, filed Sep. 5, 1991, U.S. Pat. No. 5,218,196.

BACKGROUND OF THE INVENTION

1. Field of the Invention

This invention relates to photodetection systems and related circuitry which, upon the occurrence of a specified event, generate an output control signal. In particular, this invention relates to a system of interrelated electrical, optical, and mechanical modules designed and deployed so as to sense the intrusion of an opaque object into a controlled space and upon such sensing to immediately initiate a machine-stopping or machine-starting sequence. More particularly, this invention relates to improved light curtain systems manifesting increased reliability and accuracy and imperviousness to spurious signals. More particularly yet, this invention relates to a microcontroller-based light curtain system containing an integrated collection of improvements over traditional light current systems. These improvements include provisions for continual self-testing during operation—including self-monitoring for deliberately simulated false events—as well as the means to react to detected defects in a manner safeguarding those depending on the safety switch nature of the light curtain.

2. Description of the Prior Art

A photodetection system—or "electric eye"—plays the role of a switch. In general, it does not by itself cause things to happen, but it generates a control signal that triggers other mechanisms. When the system creates a planar light wall over an extended plane—as opposed to a single narrow beam of light—it is referred to as a "light curtain." This type of photodetection system is then an area light switch, since it generates an output control signal whenever anything opaque to the light penetrates the area defined by the light.

Although its use in stopping fast machinery is of relatively recent origin, the basic electric eye has been used throughout most of this century in one form or another. For a minimal light curtain, all that is needed is an extended light source directed toward an extended light detector, with the latter wired so as to provide an output signal related to the light flux incident on it. This minimal setup was sufficient for thousands of different types of light-based control systems developed during the past 60–70 years, control systems ranging from the mundane (e.g., grocery store door-openers) through the exotic (e.g., marking the passage of short-lived elementary particles) to the critical (e.g., split-second deactivation of fast machinery). For some of these applications—and especially the last-mentioned—it is very important that the control system give a positive response every single time that the event-to-be-detected occurs and that it never give a positive response in the absence of that event. Light curtain applications demanding extreme speed coupled with great dependability can be implemented only after many problems have been resolved. These problems arise in part because it is a balanced dependability which is sought; not only must the light curtain switch always send out the appropriate control signal when the triggering condition is present, but it must never send out that signal when that condition is not present. (It is fairly easy to deliver a circuit which will always respond to the triggering condition, providing that no difficulties arise when the circuit stops the machine occasionally in the absence of the triggering condition. Similarly, it is easy to deliver a circuit which will never generate a control signal in the absence of the triggering condition, but at the cost of occasional failures to generate a control signal when the triggering condition is present.) Bearing directly on the dependability of the total system is the long-term dependability of the output control device—typically an electromechanical relay—which must always respond properly to the control signal generated by the front end of the system. Finally, some self-correcting means must be built into the light curtain switch so as to compensate for any gradual drift or degradation which may occur in any of the components, especially the light sources and detectors.

The present invention addresses the dependability requirement and relates most directly to the safe operation of machine-guarding light curtains comprising: 1) an array of discrete photosources, each directing light onto a particular member of 2) a matching array of discrete photodetectors which are tied into 3) circuitry capable of producing a control signal that opens 4) an output control device whenever the flux of photosource light incident on one of the photodetectors decreases by more than some specific amount. The output control device—most commonly an electromechanical relay—is in turn part of a simple current loop emanating from the machine to be controlled; the interruption of that current loop initiates the machine's stopping mechanism. When viewed in this manner, it is clear why the light curtain system (including the relay) is often viewed as a "switch." Such light curtains serve as switch elements in control systems commonly used to halt (or, sometimes, to activate) machinery when an opaque object—e.g., a hand—moves between the photosource array and the photodetector array. One speaks of such an object as "penetrating the light curtain." Although the present invention will be seen to have applications wherever both sensing speed and high dependability are at a premium, it is sufficient for present purposes to describe it in the context of prior art related to machine-guarding light curtains.

The speed with which a light curtain system initiates a machine's stopping sequence depends largely on the type of components used, how quickly the circuit processes information, and how quickly the relay opens upon receiving the appropriate signal. With modern solid state devices, the factor determining how quickly the relay receives its "opening" signal is the method used to enhance system dependability; error checks and system verification take time. Ideally, however, that time should be much shorter than that which the relay takes to open after receiving the signal, in which case the overall response speed is still determined by the relay's speed.

DEPENDABILITY CONSIDERATIONS

A false positive is defined here as an output control signal (a "time-out" signal) generated without any penetration of the light curtain. A false negative is the failure of the output control device to function even though the light curtain was penetrated. (This may occur either because no output control signal was generated or because the relay failed to open in spite of receiving such a signal.) The reason for avoiding false negatives is clear: the curtain penetration may be by a hand on its way to the hazardous part of the guarded machine. As a practical matter, it is also very important to avoid false positives: an operator confronting a safety system which shuts down production needlessly may well deride to dispense entirely with the safety system, leaving the machine unguarded. For analyzing light curtain reliability, one can break the potential trouble areas into three categories: light problems, component failures, hardware mismatch.

(a) Light problems in traditional systems

One source of both false positives and false negatives is the light environment in which the light curtain is typically used—factory settings bathed in a variety of fluctuating light: visible, infrared, ultraviolet. As a consequence, the light incident on the photodetector array may be constantly fluctuating even without an opaque object penetrating the gap between it and the photosource array. (Strobed light sources external to the system are particularly troublesome.) Ideally, one wants to maximize the sensitivity of the photodetectors and associated circuitry so that the system will act on an extremely small decrease in incident light flux. The fluctuating light extraneous to the light curtain's photosources can limit usable sensitivity; in order to avoid false positives, the sensitivity of the system must be reduced if there is fluctuating extraneous light incident which is within the response range of the photodetectors. False negatives can also arise from extraneous light. For example, just as a hand penetrates the curtain, a fortuitous increase in incident extraneous light may nullify the flux decrease at the detectors which would otherwise occur and serve to trigger a control signal.

Prior art attempts to solve the extraneous light problem have included separate monitoring of ambient light, for the purpose of electronically subtracting that light from the total flux recorded by the photodetector during the period the photodetector is normally illuminated by the photosource. See, e.g., U.S. Pat. No. 4,749,853 (1988, Salim). This approach does not seem practical in a situation where great speed is needed and in which there is no "safe" part of the machine cycle during which to measure and store the ambient irradiation. Furthermore, it is only useful in eliminating that extraneous light which is quasi-static; pulsed extraneous light with pulse lengths shorter than the machine-cycling period will still have the potential to cause false negatives and false positives.

Other approaches involve "labelling" the source light by one means or another. In U.S. Pat. No. 4,650,990 (1987, Jonssen) the emitted beams were pulsed so as to impress a binary code on them. The photodetectors then could ignore all light which did not display the proper code. This method is quite clever but appears to involve logic circuitry which slows the overall response time of the curtain excessively. Furthermore, light pulses of long duration ($\geq 3$ ms per sensor pair) are required for proper light source identification.

Another and simpler method of labelling involves analogue modulation of the light source, usually with a sinusoidal amplitude modulation being superimposed on a square wave signal. The modulation is the same for all sources and the needed separation of the received signals is obtained by activating only one source/detector pair at a time. A multiplexer arrangement can then be imposed to send the source signals to all of the sources, with each being activated in turn. Similarly, a demultiplexer arrangement is used to draw the detector signal from each detector in turn for subsequent processing. The processing of the complex electric signal generated by the incident light includes a high-pass filter as well as phase-sensitive detection. This provides a highly selective means of amplifying only that component of the incident flux which comprised part of the light curtain. Extraneous light still has the potential of saturating the device used for detection. This means that it may not be enough just to electronically separate it out from the flux of interest. Therefore, as part of an additional means of reducing errors associated with ambient light sources, some systems—including those of current applicants'—utilize light outside the range of the most intense extraneous sources, and then optically filter the light incident on the photodetectors, so as to admit only light in the band emitted by the photosources, typically the infrared band. See, for example, U.S. Pat. No. 3,805,061 (De Missimy et al., 1974) and U.S. Pat. No. 3,774,039 (Price, 1973).

Although there are many reasons for using an array of discrete photosources and discrete photodetectors—instead of a single large source and a single large detector (the usual approach for simple "electric eye" controls)—one of the main advantages of this approach is the increased sensitivity to small changes in the light flux which it provides. As in most incremental measurements, the greater the relative change in the light, the easier it is to measure the change. A hand penetrating a light curtain will block roughly the same flux regardless of whether the total flux is detected by a single large detector or by a plurality of smaller detectors deployed across the flux path. However, since most of the blocked flux will have been directed toward a localized detection region, the use of a plurality of discrete detectors will result in a much greater ratio $\Delta\phi/\phi$, where $\phi$ is the initial flux falling on a detector and $\Delta\phi$ is the change in flux due to the blockage.

One of the problems introduced by the use of discrete photodetectors is optical cross-talk, where light intended for one detector will illuminate an adjacent detector—either because of deflection or because of beam width—so as to cause false negatives or false positives. Attempts to circumvent the light deflection problem have taken several forms, all utilizing the fact that the plurality of photodetectors is illuminated by a plurality of photosources, with a matching of source/detector pairs. One such attempt is the digital encoding scheme of Denton referred to above, in which each photosource produces light with a unique digitally-encoded signature, a signature which only can be detected by the circuit of the matching photodetector. Another approach is to activate only a single source/detector pair at a time. This eliminates any possibility of light from the "wrong" photosource illuminating a particular detector. It also simplifies the photosource and photodetector circuitry, since the signal processing for all of the individual photosource units can be done in series by one subcircuit, and similarly for the photodetectors. On the other hand, this arrangement requires circuitry capable of cycling through the entire plurality of source/detector pairs in a time short with respect to the other speed-limiting factors. Typical times characteristic of this cycling are 200 μsec per pair, so that an entire curtain comprising eight source/detector pairs could be cycled through in a little under 2 msec. This is considerably less than the characteristic response times of the electromechanical relays used to initiate machine-stopping mechanisms.

(b) Component failure in traditional systems

To varying degrees, components—electrical, electromechanical, and optical—are subject to failure in every section of the light curtain system. Several types of failure are critical in that they can generate false negatives with no warning. This was especially true with early system designs. For example, the electromechanical relay typically constituting the output control device always falls eventually and its failure mode consists of the contacts welding shut. When this happens, the machine-stopping mechanism will not be initiated upon the light curtain being penetrated, even though everything else works perfectly and an output control signal is generated and sent to the relay. The obvious consequence is to leave a hazard zone unprotected, and under conditions where the machine operators believe that it is protected.

Relay failure modes—in addition to the contact-welding failure mode discussed above—include coil fatigue and contact armature fatigue, in which the relay will still open upon command, but over times which may be much greater than the design time (typically 20 ms). This obviously can result in the machine-stopping mechanism being initiated too late to prevent an injury, since light curtains are normally placed a distance in front of the hazard which is somewhat greater than the distance a moving hand can cover during the time within which the complete system is supposed to be able to halt the machine.

Even though light curtain systems have traditionally incorporated relays with a very high "average cycles-to-failure" rating, there is still no assurance that a particular relay will not fail early; worse, there is no operational way to determine how close a relay is to failure. The common response to this serious predicament has been to use a plurality of relays wired in series so that, even after one relay has welded shut, the others can still open the machine control current loop and initiate the machine-stopping mechanism upon receiving the output control signal. Of course, if there is no way of knowing when the plurality of functioning relays has been reduced to a single relay, this approach just defers the problem. U.S. Pat. No. 4,266,124 (1981, Weber et al.) provides a variation on this approach, instituting a rudimentary means of monitoring the state of the relay. Weber et al. uses two normally-open relays wired in series, so that the machine-stopping mechanism is triggered by either relay opening. I.e., both relays must be activated—closed—for the guarded machine to operate. Using the fact that a closed relay in the machine current loop will pass current with negligible voltage drop and that an open relay in the machine current loop will display a voltage drop, Weber et al. determines the state of each relay by placing across it a voltage-measuring "contact monitor." Each contact monitor is connected to the light curtain's general control circuit which makes it "aware" of whether its relay is supposed to be open or closed. If either contact monitor receives conflicting information, if, in particular, it finds closed a relay that is supposed to be open, it will send a deactivating signal to both relays, a deactivating signal that also latches the relay open. Once a relay is latched open, it cannot be closed again in the usual manner, and an extended machine timeout is enforced while the initiating problem is investigated. At the time the relay deactivation/latching signal is sent, an indicator light is illuminated to show the operator that one of the relays is malfunctioning and has been stopped in a "fall-safe" mode. This system of relay safeguarding, while a step in the right direction, is unable to guard against simultaneous failure of both relays, which will have been subjected to the same level of cycling fatigue. Furthermore, there are circumstances under which connecting a monitoring circuit directly across a relay is undesirable; in general, placing any additional device into the otherwise simple current loop controlling the machine stopping mechanism is undesirable. No matter how cleverly that device is designed, it still provides the possibility of an undetected current path around the relay contacts, which could be disastrous. What is needed is a method of monitoring the state of the relay without making electrical connections across the relay contacts. What is also needed is a means of interrupting the current loop in the event of complete relay failure.

Apart from relay problems, serious component failures include the photodetector circuit falling in such a way that it continues to generate an output characteristic of full illumination, regardless of the light level incident on the detector. For example, in the traditional systems the operational amplifier (OP-AMP) which is fed by the photodetectors in sequence may freeze in the logic one (or high) state, thus putting out a signal indicative of an illuminated detector regardless of the actual light level at the detector. A similar result can arise from failures in multiplexers and other integrated circuitry—all sensitive to static electric charge. In addition, microprocessors can fail internally in such a way that they stop processing input data, or fail to receive it—both situations resulting in erroneous output signals. It is in the nature of modern solid state components and integrated circuits that such failures can occur without warning. Furthermore, the outward manifestation of failure can be very subtle, with the true consequences not showing up until the light curtain is penetrated in some specific manner and the system fails to send a "timeout" signal to the relay. What is therefore needed above all else is an active error-checking mechanism to continually validate the entire control system by, among other things, sequentially and repetitively generating bogus signals simulating those which would arise upon each sector of the light curtain being penetrated. The monitoring system which is needed also must be capable of sending a latching signal to the relays in case a failure is detected. Furthermore, it must be sufficiently integrated with the total system such that it can generate a false positive, note whether the system reacts properly, and—depending on what it notes—either block the effects of the simulated penetration or proceed to latch the relay; and it must be sufficiently fast that it can carry out all of these logic steps in a few microseconds. Further yet, it must be able to perform these steps while simultaneously performing its normal functions.

Although not the result of component failure in the usual sense, "cross-talk" between different detector circuits is an electrical component problem. There is also always the possibility of "cross-talk" within the extended circuit such that a "beam on" signal from one detector circuit induces a similar signal in the circuit associated with a detector for which the light beam has been interrupted. To a large extent this problem can be addressed by rapidly cycling through the plurality of source/detector pairs so that only one source is emitting at a time and only its matching detector circuit is activated at that time. Nevertheless, this solution to the problem of cross-talk involving multiplexing also demands strict monitoring of the system to ensure that the source/detector pairs are activated singly and in the right order. What is further needed is a method of monitoring the monitors.

One further essential characteristic of the monitoring scheme called for above is that it be able to ignore "functional" noise fluctuations, those blips which occur in a normally operating circuit without reflecting any malfunctions. It is in the nature of low-level currents and voltages that occasional noise fluctuations occur. An individual noise fluctuation viewed in isolation may appear to be a system failure instead of just a random statistical blip in running of a properly-functioning integrated circuit. A monitor which shuts down the system in the face of each such blip would be unacceptable. Consequently, what is needed in light curtain monitoring system is a system which is very sensitive and very fast to react to true malfunctions but which is able to discount one-time, electrical transients not affecting the safety of the light curtain. A final requirement on such a monitoring scheme is redundancy in the monitor itself, so that failure of the system circuit does not leave the system unprotected. What is thus needed is a redundant circuit which can supersede the defective circuit in such a way that the required protection is maintained while a warning indicator is activated.

None of the prior art provides for a comprehensive active system monitor which is both fast and flexible in the manner described above.

(c) Hardware mismatches In traditional systems

A more mundane—but no less serious—problem is the simple mismatch of the hardware by the installer. Typically, light curtain systems are sold to factory owners who then install them. The problem arises in part from the practice of standardizing (or "modularizing") certain common pieces of equipment. For example, light curtains of varying sizes may all use the same basic control box design, the specificity being added by means of programming software and the setting of switches within the box. This common approach leads to many economies of manufacture. However, it can also contribute to errors in assembly. For example, a factory operator in attempting to repair a 16-pair system might replace a malfunctioning control box set up for the sixteen pairs with an identically-appearing box set up to control only eight pairs. The replacement control box would then cycle through just half the pairs plugged into it, leaving half of the plane to be protected unguarded. (Since the controls are typically set to detect a reduction in the light reaching a detector from a particular source, it can happen that if both halves of the source/detector pair are cut out of the system, the controller will see no problem.) What is needed, therefore, is an automatic setup-checkup process to look for and report any hardware mismatches of this type. What is further needed is to have this process integrated into the overall monitoring/watchdog system described above.

Therefore, what is needed is a system that quickly and reliably initiates a machine's stopping sequence, wherein detection sensitivity is maximized and extraneous light fluctuations are minimized. What is also needed is a system that provides a means of interrupting the current loop of a machine in the event of a complete relay failure wherein a continuous active error-checking mechanism validates the entire control system. Further, what is needed is an error-checking mechanism that ignores functional noise fluctuations while at the same time remaining very sensitive and very fast. Still further, what is needed is a monitoring scheme with a redundant circuit that can operate to supersede a defective primary circuit. What is also needed is a hardware mismatch evaluation process incorporated into a mechanism for quick and reliable machine-stopping initialization.

SUMMARY OF THE INVENTION

The light curtain switch of the present invention combines many individual improvements in light switch technology along with a new unified approach to the monitoring of the overall system. The heart of the invention is a pair of programmable microcontrollers—a SYSTEM microcontroller and a WATCHDOG microcontroller—the function of which is to operate the light curtain switch and to check up on the integrity and to verify the proper functioning of the system. One of the key checks performed is the introduction by the WATCHDOG microcontroller of a bogus signal at the front end (the light production end) of the light switch complex so as to simulate a light blockage, and then to observe whether the system—including the SYSTEM microcontroller—responds properly, in particular whether it generates an output control signal. If the WATCHDOG microcontroller finds proper operation, it will override the output control signal; if it finds improper operation, it will itself send a signal to the output control device which has the effect of latching that device open. By this single feature—one of many made possible through the incorporation of "intelligence" into the electronics—the light curtain system of the present invention overcomes many of the problems set out above. Of course, it is to be understood that utilization of a specific dual-microcontroller system is not required for all purposes. Instead, any type of microprocessing system can be used provided it is designed to track and correlate the required information, and to provide command signals within a specified time frame.

In summary, the present invention includes a control circuit containing the SYSTEM and WATCHDOG microcontrollers, an array of photosources—such as light-emitting diodes (LEDs), gas discharge tubes, etc., an array of photodetectors—such as photodiodes, phototransistors, photocells, etc., and an output control device. The output control device is normally connected in series with a current loop emanating from a machine to be guarded, so that when an output control signal is sent to the output control device, that current loop is opened up and the machine-stopping mechanism initiated. The individual photosources and photodetectors are activated by the control circuit in a pairwise fashion so that only one photosource is emitting light at a time and only the photodetector paired with that photosource is activated to measure light at that moment. For this purpose, the control circuit puts out a pulse train which is distributed by a standard multiplexer circuit so as to cause the pairwise activation. The multiple output for the array of photodetectors is fed into a demultiplexer. The resultant pulse train is input to the control circuit for analysis.

The photosources produce—and the photodetectors detect—light in the infrared range and there is a lens system associated with the two arrays so as to maximize the light incident on a given photodetector from its matched photosource. The lenses of the present invention are concave/convex that produce a short focal length back toward a particular photosource or photodetector, and a long focal point on the front side. This produces a very narrow beam width. The angle of incidence of the particular light beam, which is +3 degrees, minimizes the effects of the beams' reflected light. Furthermore, shatter-resistant, abrasion-resistant infrared filters reduce the intensity of light waves below 880 NM by about 95%.

INDIVIDUAL INNOVATIONS

Output Control Device

The ideal output control device consists of a primary part normally controlling current flow in the machine-stopping current loop, a provision for monitoring the health of the primary part, and a backup part which can control the current flow should the primary part be found to have failed. Additional constraints on the ideal device are 1) the backup part be kept in like-new condition against the day that it must serve and 2) the monitoring of the primary part must not create a potential interference, mechanical or electrical, with the operation of the primary part. The output control device of the present condition meets all of those invention. Although it can be seen to have more general applicability, for definitiveness it will be discussed in terms of its preferred embodiment. Some of those general applications include incorporation of such an output control device in a fire detection system, in a general alarm system, and any other type of system requiring rapid reaction to a signal input.

The output control device has a compound primary relay and a simple backup relay. The compound primary relay actually consists of two primary relays wired in series—and in series with the backup relay—and two dummy relays, which are not wired into the machine-stopping current loop. (The use of two primary relays is not key; a single one could be used, or more than two. The purpose in using more than one is to provide added redundancy, though with the safeguards of the present invention that is probably not necessary.) The two primary relays close upon the energizing of an associated primary solenoid or solenoid pair. The backup relay closes upon the energizing of an associated backup solenoid and may, alternatively, be wired separately to the machine-stopping current loop, rather than in series with the two primary relays. During normal operation, it is only the primary solenoid which is de-energized when a light blockage occurs. The backup solenoid remains energized throughout the operating day, so that the backup relay flexes only upon power-up and power-down. In addition, the backup relay can be configured with two control contacts, each servicing an independent primary relay, rather than the coupled relays described above. The backup relay can also be designed with one set of contacts for controlling power through both primary relays and another set of contacts to the machine-stopping current loop. Alternatively, the backup relay, in addition to the primary relays, can directly control power to the machine.

Each of the two primary relays is mechanically coupled (ganged) with one of the dummy relays, in such a way that the state (open or closed) of each dummy relay is uniquely determined by the state of its ganged primary relay. Should the primary relay weld shut, the associated dummy relay will remain in the state associated with that primary relay being closed, regardless of the energizing of the primary solenoid(s). It can be seen that this mechanical ganging permits the state of each primary relay to be determined without need to make any electrical connections across that primary relay itself. For example, an ohmmeter attached across the contacts of a dummy relay could serve that function. There are a variety of ways in which the state of either of the dummy relays can be determined. The method set out in the PREFERRED EMBODIMENT consists of connecting one side of a dummy relay to a dc voltage terminal of the control circuit's power supply and the other side to ground through a large resistor. The state of the dummy can then be measured by noting the voltage drop across the large resistor. With the dummy relay open it will be zero; with the dummy relay closed, it will be some finite positive value (basically the voltage put out by the power supply at the terminal in question; all the drop will occur across that resistor). The voltage drop across the resistor—a bimodal value—is then observed by one of the microcontrollers. When it is noted to have a value incommensurate with the state of energization of the primary solenoid, the microcontroller de-energizes the primary solenoid(s) and the backup solenoid. Furthermore, that microcontroller imposes a latching condition so that it is not easy to re-energize either solenoid. This helps ensure that the problem with the relay will be resolved before the guarded machine is run again.

One compound relay which is available contains a normally open (n/o) pair which is appropriate for the primary relays. (It is important to use a n/o relay to ensure that the current loop will open upon failure of power to the solenoid.) It also contains a normally closed (n/c) pair which can serve as the matching dummy relays. When such a unit is used in this invention, a high monitor signal is commensurate with an energized primary solenoid and a low monitor signal with a de-energized primary solenoid.

As indicated, the backup relay contacts open only upon a failure of the available primary relays or when the system is powered down; they do not cycle upon penetration of the light curtain, providing that the primary relays both perform properly. This is important, because it is the eventual welding (or other failure, defined as a relay reaction time exceeding a predetermined value) of the primary relays which the backup is to provide security against. Welding occurs because of the pitting and softening of the contacts' metal surfaces due to arcing, which can be associated with opening and closing the contacts. Minimizing the switching activity of the backup relay avoids this and also lessens the metal fatigue of the contact armature and coil, which might otherwise result in sluggish relay response. The backup relay is cycled and checked during startup. Apart from this, it is only during failure of a primary relay that the backup is opened and upon that occurrence it is latched open. Also, the backup relay contacts will open upon indication that primary relay solenoid coil(s) has/have failed. However, reliance upon the backup relay in this case is generally not required, due to the system-wide monitoring conducted by the microcontrollers of the present invention. As previously noted, the preferred embodiment of the use of such relays in a light switch system can readily be seen as one of many alternative utilizations of the novel relay system, including, but not limited to fire detection systems, with light switches being only one alternative.

Power Supply

The light curtain switch of the present invention uses a split power supply to ensure dependable and rapid opening of the output control device upon receipt of an output control signal (or "timeout, latchout" signal). The power supply design was also selected with the minimization of electrical noise from the control system which, since it is highly tuned to pick up abnormal signals, might otherwise be tripped by such noise and produce excessive nuisance shutdowns.

The AC power line feeding the AC power supply is filtered to minimize electrical "line noise" introduced into the system. The AC power is stepped down in voltage and passed through a full-wave rectifier so as to produce two DC voltage taps: 5 VDC and 6 VDC. These voltages are further regulated to eliminate fluctuations. The reason for proceeding in this fashion, splitting the final DC power, to separate the power for the primary relay solenoid from that for the rest of the circuit. In this way, noise caused by the energizing of the primary solenoid coil will not be introduced into the control circuit.

Further precautions are taken to guard against overvoltages being applied to the control circuit and undervoltages being applied to the microcontrollers. In particular, there is an overvoltage detection circuit placed on both the 5 VDC and the 6 VDC lines. In the event a spike gets through both the input filter and the transformer, this overvoltage protection circuit will activate, sending the voltage to ground. One can think of such overvoltage protection circuit as a reverse-biased Zener diode with reverse breakdown at the appropriate voltage, either 5 or 6 V, with one lead grounded. When the overvoltage spike causes the momentary flow of current to ground, there will be a current spike drawn from the power supply; this will activate a circuit breaker and interrupt power. This approach prevents overvoltages from entering the control circuit itself, where it could easily damage the integrated circuit chips (ICs).

Undervoltage detectors are on the DC power line coming into each of the microcontrollers. They intrude and activate a program reset whenever the voltage on the line fails to 4.7 VDC. (The resetting of the microcontrollers will cause the relays in the output control device to open.) The purpose of the undervoltage protection is to prevent the microcontrollers from entering a "confused" state in which data becomes jumbled and switching points ambiguous, in a manner characteristic of binary logic circuits.

Array Shielding

In response to a concern with spurious voltages, the control circuit is placed in a well-shielded box. This still leaves the large arrays of photodetectors and photosources directly exposed to the factory environment, with its ample supply of RF and lower-frequency EM waves. To guard against such interference the photosources and photodetectors are encased in thick grounded aluminum cases, and with all connecting cables well-shielded. To complete the electrical shielding of the sources and detectors, the glass windows leading to the sources and detectors are painted with an electrically-conductive material transparent to the infrared. The wire in the cable assembly which connects the aluminum cases to ground thus serves to electrically ground the window surfaces as well.

Error Register and Response

There are two types of responses which the control circuit sends to the output control device. The first type simply de-energizes the primary solenoid, and occurs during startup checks, during running checks, and when the light curtain is penetrated. The second type is sent when the control circuit has "concluded" that there is a malfunction somewhere in the system and it is supposed to de-energize the backup solenoid. When that second output control signal is sent, that part of the control circuit which energizes the solenoids is "latched" so that re-energizing cannot be accomplished in the normal way.

The control system of the present invention is very sensitive to stimuli of both kinds, those indicating light curtain penetration and those indicating a malfunction. Given that sensitivity, it is important to provide some flexibility so that false positives associated with electrical transients are not acted upon. To avoid nuisance shutdowns based on an error or penetration indication lasting a millisecond or less and arising from a short-term electrical transient ("glitch"), the present invention provides for computer flexibility, for intelligent response to stimuli. In this way, only for those stimuli which occur more than a specified number of times during a specified time period (which may be on the order of 100 milliseconds) or which last for more than a specified period of time—an equivalent condition given the digital nature of signal generation and analysis in the control circuit—will either type of output control signal be sent. This uses a "fault register" in each microcontroller and works as follows. Say that the WATCHDOG microcontroller is checking for a pair-activation code failure (see below). It receives code every 200 microseconds from the SYSTEM microcontroller. Based on the last transmission, the WATCHDOG can predict what the next code transmission will be. If the next code is not the predicted one, the WATCHDOG microcontroller records a fault on its fault register. If that fault register reaches some preset number (say, 20) during 255 cycles (255×200 microseconds), the WATCHDOG causes an output control signal to be sent to the output control device. On the other hand, if that preset number is not reached during 255 cycles, the fault register is set to zero and the process begins again. This principle—though used in the context of the new light curtain control circuit—can be extended to many systems where high sensitivity must be achieved in the presence of electrical transient spikes.

Internal Calibration System

Over a very wide range the light curtain system of the present invention can engage in internal adjustment and self-calibration. One approach is to examine the height of the pulse generated at a photodetector by unblocked light from the photosource which is the mate to that detector. If there is an effective degradation of a source (which in addition to a reduced output by an LED, for example, can arise from factors which increase the attenuation along the optical path leading from the source to the detector), the control system will increase the current through the LED or in equivalent ways increase the optical output of whatever other photosource may be in use. In the alternative, should this not be adequate, the same result can be achieved by changing the threshold level at which the detector in question responds.

On occasion, it may be necessary to adjust for an increase in light level. For example, a detector output pulse of 40 mV or lower may be indicative of blockage by an object of the minimum size for which the light curtain is rated if the level in the absence of any blockage is 60 mV. If for some reason the level in the absence of blockage is much higher, say, 300 MV, there is the danger that even with blockage by an object of the rated size the residual voltage pulse from the detector may exceed 40 MV. The present system examines the detector output level in the absence of blockage. In the case of excessive light, the fixed threshold level for inferred blockage is replaced by a level equal to 90% of the unblocked level. In the alternative, a similar result could be achieved by retaining the fixed detector threshold voltage and simply reducing the LED output. The point of this aspect of the invention is the ability built into the present device to sense the light level and make appropriate internal adjustments. Because of standard safety practice this must be done without adjusting the gain present on the photodetector array.

Source/Detector Pair Activation

In normal operation the SYSTEM Microcontroller sequentially activates the photosources so that only one is energized at a time. The SYSTEM Microcontroller also sequentially activates the photodetector array, ensuring that there is synchronization between the energized source and the activated detector. (Although the duration of activation of a particular detector may exceed that of its matching source, the sequencing is arranged so that no two detectors are activated at the same time and so that no detector will be activated while any source other than its matched source is activated.) Throughout this time, the WATCHDOG Microcontroller is monitoring the program half-a-step ahead of the SYSTEM Microcontroller, checking to make sure that the proper sequential signals are being transmitted by the SYSTEM. A light filter in front of the detector permits only light in the correct wavelength range to penetrate to the operative part of the detector. A phase-sensitive detector further isolates the signal from the background light and noise. A further optical safeguard to eliminate extraneous light is the use of a polarizer/analyzer pair in front of the source and detector respectively. In this manner, the system eliminates optical cross-activation, and extraneous-light activation, permitting a greater sensitivity to be used in the signal verification.

Environment Hardening

As with any industrial control product, the light curtain system undoubtedly will be exposed to harsh treatment due to the environment in which it must be located and also because of the maintenance which it must undergo. Among other assaults, it will be subject to being struck by metal workpieces being fed into the machine on which it is mounted and it will be splashed by numerous solvents and cleaners. As a means of strengthening system reliability and durability in the face of this hostile environment, all array and control enclosure components are made of metal and supplied with extensive sealing to resist moisture intrusion. Moreover, the infrared transmitting array windows are made from impact-resistant plastic and are coated to prevent scratching from normal cleaning maintenance.

INTEGRATED SELF-CHECK

The light curtain system of the present invention performs thousands of internal self-checks a second while also checking over the entire system outside the microcontrollers, all while the light curtain is performing its machine-guarding function. The checks performed by the new system can be categorized in general as follows: (1) Hardware checks (source/detector alignment and equipment mismatch tests); (2) Output control device integrity check; (3) Internal system code (software and hardware) verification checks; (4) Complete system integrity checks; (5) Data Transmission and Processing checks; (6) Computer Operating Properly (COP) checks; (7) Clock Monitor checks.

Hardware Checks

Hardware Mismatch

This check—actually a sequence of checks—searches for mismatch of hardware, e.g., the use of a 16-pair light curtain array with a control box set to operate only an 8-pair array. They are performed during the set-up procedure with the relay in the de-energized state with power on. (In other words, the relay is "open" during this stage, preventing operation of the guarded machine.) During the pre-operation hardware check, the SYSTEM microcontroller reads the six-position dip switch in the control box to determine the number of source/detector pairs the control is set to operate. This number, p, is stored in the memory of the SYSTEM microcontroller. The WATCHDOG microcontroller polls the number of sources, s, in the photosource array as well as the number of detectors, d, in the photodetector array. The WATCHDOG microcontroller then checks whether s equals d and, if it does, the WATCHDOG microcontroller sends this number to the SYSTEM microcontroller while simultaneously eliciting the number p from the SYSTEM microcontroller. At this point, both microcontrollers have both numbers p and s and can independently check to see whether p equals s.

The overlapping redundancy of the SYSTEM and WATCHDOG operations, one of the strengths of this invention, shows up particularly well in the equipment mismatch check. Only if the WATCHDOG finds the number of detectors to be equal to the number of sources does the comparison between the microcontrollers even take place. At that point both microcontrollers compare that number with the number of pairs which the system is programmed for. Then, only if the results of the WATCHDOG and the SYSTEM agree (and note that among other things, this check provides a test of the ability of the SYSTEM and WATCHDOG to exchange data) will the setup process continue. If any comparison shows an inequality, the setup process is halted and the operator is notified—through an error message on the control box—both of that fact and of the particular failure encountered. The output control device cannot be activated—and hence the guarded machine cannot be started until this test—and the others following it—have been successfully traversed.

Alignment Test

It is essential to the performance of the light curtain of the present invention that each individual source in the photosource array line up with its matching individual detector in the photodetector array. The SYSTEM microcontroller handles this hardware check during the setup mode. In particular, the SYSTEM microcontroller transmits a plurality of labelled signals, in series, to the photosource array. The series is muitiplexed such that each source in the array receives an individual signal. The resultant signals from the detectors in the photodetector array are then demultiplexed and a detector pulse series is transmitted to the SYSTEM microcontroller. The SYSTEM microcontroller evaluates the detector pulse series to determine whether the particular detector signal received matches the corresponding labelled signal from an aligned photosource. If a match is not made, the relays of the output control device are latched open and an appropriate error message is sent to the machine operator.

Output Control Device Integrity Check

This check is first performed as part of the startup test sequence, then after every actuation of the output control device during operation. In the case of the output control device being an electromechanical relay, the purpose of the check is to ensure that the relay contacts are opening and closing properly; it is carried out and monitored by the WATCHDOG microcontroller which, after determining whether the contacts are operating properly, sends this information to the SYSTEM microcontroller.

One embodiment of the present invention incorporates a compound primary relay with two sets of primary contacts, with a monitoring means on each so that the state of the relay contacts—open or closed—can be read by the control circuit. The monitor signal is bimodal, so that the WATCHDOG need only look for a "0" or a "1" signal to know the state of the relay. It knows the state the primary relay contacts should be in, and if it finds that they are in the opposite state, it will act to open a backup relay.

In a role-reversal, the SYSTEM microcontroller monitors the WATCHDOG to verify that the check was performed. If the SYSTEM microcontroller finds that this check was not performed, it takes over end deactivates the relays.

Any attempt by an operator to re-initialize the normal cycle after a "latchout" will automatically force the system into the setup mode. In the setup mode, both primary relay contacts and the backup relay contacts are open and remain open until all startup checks are satisfied. Since one of the startup checks is to verify relay contact status, the startup checks cannot be satisfied following an unresolved "timeout, latchout," and the system remains in a closed loop lockout situation. Only after the faulty relay has been replaced will the system be able to proceed to the run mode.

Since the primary relay and backup relay are intended to be incorporated into a control current loop emanating from a machine to be guarded, the circuit of the present invention contains external signal jacks into which the current loop can be connected. Other external connectors are provided to make available the output control signal, to be interfaced with those machines which can make use of it. Certain "intelligent" modalities in modern production machines can utilize such a signal to mark where in a complex production cycle an interruption occurred and in this way ensure that the work is picked up again at the proper stage once the blockage or other problem has been eliminated.

Internal Code Verification Checks

These, too, are done during the startup and then on an ongoing basis following a successful startup. Their purpose is to ensure that the proper logic codes are being generated by the microcontrollers and transmitted to the photosources and photodetectors. A three-digit code is associated with each pair. Both the WATCHDOG microcontroller and the SYSTEM microcontroller start with signal registers set to zero (000). The SYSTEM then sends out a code during each cycle (i.e., the roughly 200 μsec corresponding to the activation of each pair) designed to turn on a particular pair. It also sends this code to the WATCHDOG. The WATCHDOG checks this code with the number on its own signal register, which is indexed by unity each cycle. If the WATCHDOG gets a signal it is not expecting, it will reset its signal register to that number and also send a signal to its fault register. If the fault register gets up to a predetermined number during a certain period (such as 255×200 μsec), the WATCHDOG microcontroller will send a Control Output Signal to the control output device, thus interrupting the operation of the guarded machine. If that predetermined number is not reached during the specified period, WATCHDOG sets it fault register and the procedure commences again.

Data Transmission and Processing Checks

These examine the data generation and comparison within and between the microcontrollers. They are first conducted as a threshold measurement during startup and then as continuing routine checks throughout the operation of the system following successful startup. Their purpose is to ensure that data is being transmitted from the SYSTEM microcontroller to the WATCHDOG microcontroller within the correct time interval, typically 200 microseconds (i.e. at a 5000 Hz frequency). If the WATCHDOG does not receive a signal within the prescribed period, it will send a "timeout" signal to the PRIMARY RELAY and to the BACKUP RELAY. If such a problem is detected during startup, the startup halts. If it is detected during operation, the PRIMARY RELAY and BACKUP RELAY both will be opened within 20 milliseconds and the operator will be notified of the nature of the failure. These checks are for the purpose of detecting certain failures within the microcontrollers themselves, such as stuck code sequence, absence of code generation, microcontroller failure, and specific hardware faults.

Complete System, Integrity Checks

These checks (like those described above) are performed both during startup and on a continuing basis following successful startup. In a way, these are the most imaginative checks since they simulate a blockage of light and then look to see whether the system protection responded accordingly. Normally the SYSTEM microcontroller performs the routine functions required of the light curtain controller, while the WATCHDOG microcontroller looks over its shoulder to ensure proper function. However, once during each large cycle (during which all of the source/detector pairs have been activated once and only once), the WATCHDOG will intervene—with no signal to the SYSTEM microcontroller—so as to reduce the output from one of the sources. (For example, with LED sources, the WATCHDOG can decrease the current to the LED. There are many ways to achieve a simulated light blockage.) This will reduce the light flux on the matching detector, thereby simulating an opaque object between the source and detector in question. Next the WATCHDOG checks to see whether the SYSTEM microcontroller correctly responded to this simulated blockage, the correct response being to send a "timeout" signal to the primary relay. When this proper operation is detected by the WATCHDOG, it overrides the signal to the relay and allows uninterrupted machine operation. One of the strengths of this test is that it involves simulated blockage at the front end of the system, and thus enables examination of how the entire system responds.

For this check to be successfully traversed, the SYSTEM microcontroller must detect this darkening and send a Control Output Signal. Simultaneously, the SYSTEM is to report the darkening to the WATCHDOG. Since the WATCHDOG, having generated the bogus signal, "knows" that the SYSTEM microcontroller is responding to a false blockage signal it in turn sends an overriding signal to the relay, ensuring that it does not open (i.e., that it does not initiate the stopping mechanism of the guarded machine). With currently available electronics it is straightforward to effect this test on a given source/detector pair once each large cycle. Typically, a large cycle is completed every 12 milliseconds, which means that for a 64-pair array—in which one pair is tested with a bogus signal each cycle—the simulated blockage check is carried out on all pairs in less than a second. These checks verify the integrity of the photodetectors and associated circuitry, and the integrity of the integrated circuitry and the connections linking the two microcontrollers with each other and with the relay. It is important to note that in the event of the light curtain's optical screen being interrupted, this simulated penetration check is aborted. Once the interruption ceases, the check resumes.

The source/detector pair checked on each large cycle is indexed by means of an indexing register within the WATCHDOG. For example, if pair #4 is indicated on the indexing register, then next cycle pair #5 is selected. One way for the test to be effected is for the WATCHDOG to send out a strobe signal which reduces or eliminates the current to all photosources. The timing is such that it is pair #5 which is activated at that point. Normally, the SYSTEM will send an interrupt ("timeout") signal to the output control device. If this occurs, and is noted by the WATCHDOG, the latter will send out a blocking (override) signal. In the instance where the output control device is an electromechanical relay, the characteristic opening time is long compared with the speed of the microcontrollers and so the WATCHDOG has ample time to send the override signal, even after the initial interrupt signal has been applied to the relay solenoid by the SYSTEM. Furthermore, for electromechanical relays, the SYSTEM also provides monitoring means for evaluating the electrical operation of coil(s) of solenoid(s) used to power the relays. In operation, the false blockage signal triggers deactivation of a solenoid coil, which is monitored by the WATCHDOG that is in turn aware of the "false block" test it is conducting. The deactivation signal is then overridden by the WATCHDOG, provided the coil responds within a predetermined time period, well within the large cycle time frame.

During this test, the WATCHDOG is always aware of the state of the SYSTEM. If it notes that there is real blockage occurring in the midst of the test, the WATCHDOG ceases the test, removing the false blockage. Just like the case where the frequency of data transmission from SYSTEM to WATCHDOG is monitored, the WATCHDOG intervention in this test also can be set to be "forgiving." E.g., it might wait until the SYSTEM had failed a certain number of times to generate an interrupt signal in response to the false blockage before it applied its own interrupt signal to the output control device.

Computer Operating Properly (COP) Check

Both the SYSTEM microcontroller and the WATCHDOG microcontroller have a built-in "computer operating properly" (COP) system to help protect against software failures. This COP system is enabled in both microcontrollers immediately at power-up. It is then active in detecting a software failure during startup and at any time after a successful startup. If any software failure occurs, the COP system "times out" and resets the corresponding microcontroller, thus de-energizing the primary relay.

Clock Monitor

The COP check's efficacy depends on the clock of the larger system. If that clock falls, the COP check will not indicate any failure, either in the clock or in the software which it is designed to monitor. Thus a Clock Monitor is used as a backup for the COP system. The Clock Monitor is enabled in both the SYSTEM and WATCHDOG microcontrollers at powerup. If any of the microcontroller system clocks fail, then the Clock Monitor detects such a failure and forces the corresponding microcontroller to a reset state, thus de-energizing the primary relay. The Clock Monitor function is active in detecting the system clock failure during startup and any time after a successful startup.

PREFERRED EMBODIMENT

Figure 1:
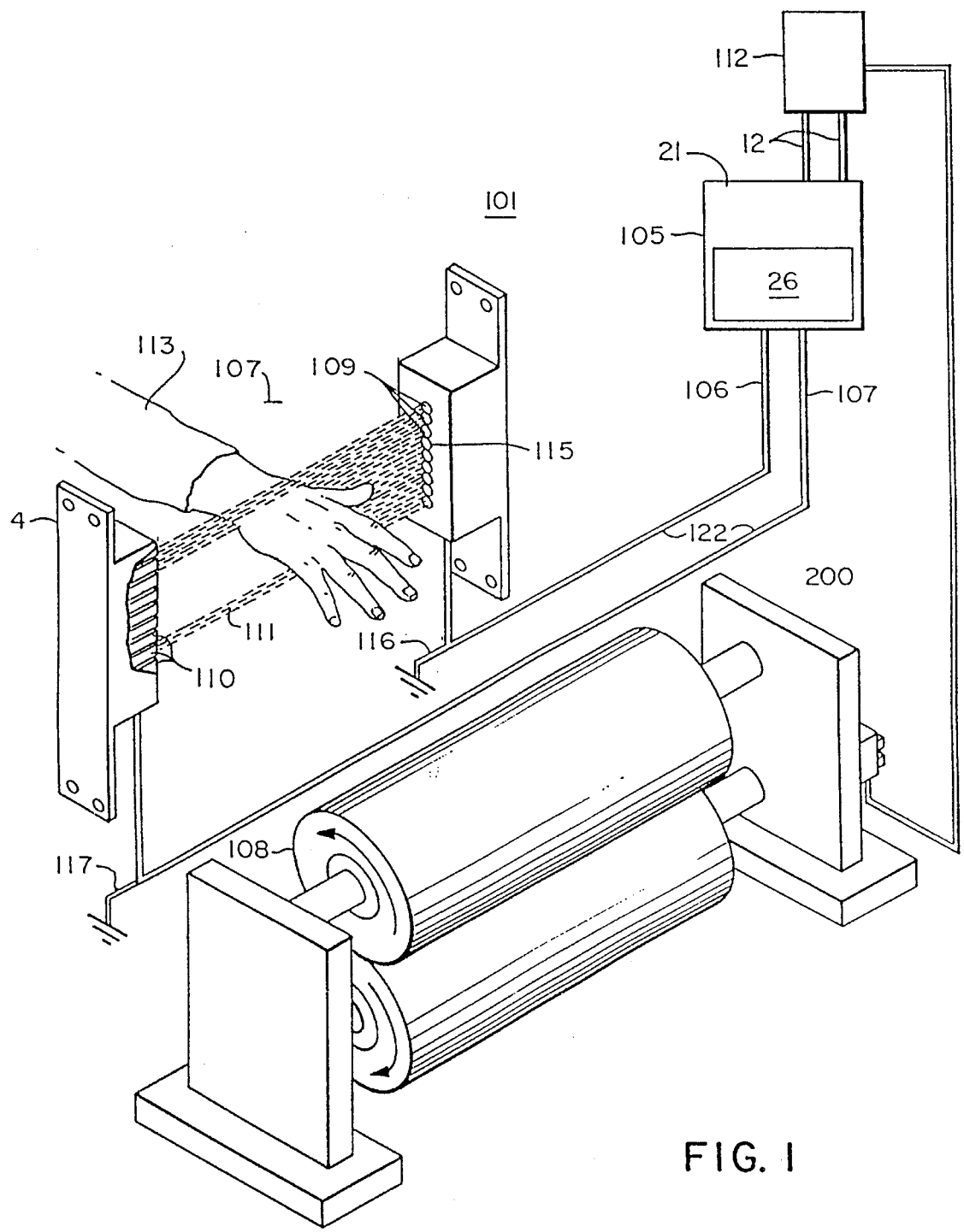
FIG. 1 is a perspective view of the light switch of the present invention in conjunction with a piece of equipment to which it is connected.

The general operation of the preferred embodiment of the present invention is illustrated in FIG. 1 by light curtain system 101, comprised of a LED photosource array 3, a photodetector array 4, a shielded control box 105, an interconnecting photosource cable 106 and an interconnecting photodetector cable 107. The purpose of said light curtain system 101 is to guard a certain area 107 in front of a hazard point such as is represented by an in-running nip point 108. Said control box 105 houses a control circuit 21 constructed to activate a plurality of photosources 109 and a plurality of photodetectors 110 and to analyze light 111 originating at said plurality of photosources 109 and incident on said plurality of photodetectors 110. When said control circuit 21 determines that a blockage of said light 111 is occurring, it acts on a machine-stopping circuit 112 through a machine-stopping current loop 12 in order to prevent an opaque object 113 causing said blockage 111 from reaching a machine 200 comprising said hazard 108 as said machine 200 is in operation. As indicated however, the detection system of the present invention may be utilized with other types of devices than simply the device illustrated as said machine 200. Specifically, such detection means can be used with any system requiring rapid response and constant evaluation for possible failures. The present Area Light Switch is in effect a switch provided to trip said machine-stopping circuit 112 if and when said area 107 is penetrated by said opaque object 113. It does not incorporate said machine-stopping circuit 112 nor does it have any separate power over said hazard 108. The novelty of this Area Light Switch is the reliability and speed with which it operates.

Figure 2:
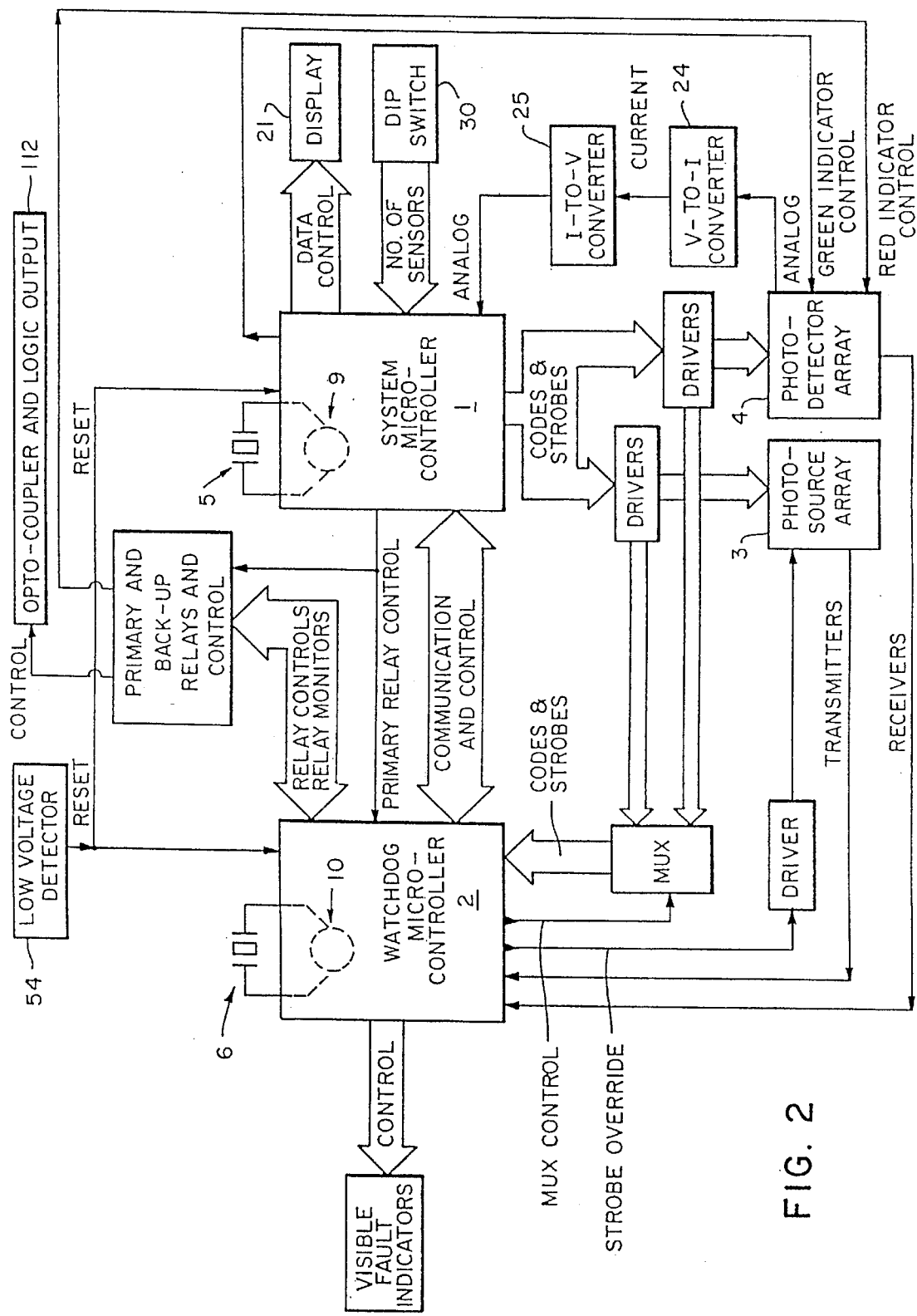
FIG. 2 is a block diagram of the present invention.
Figure 3:
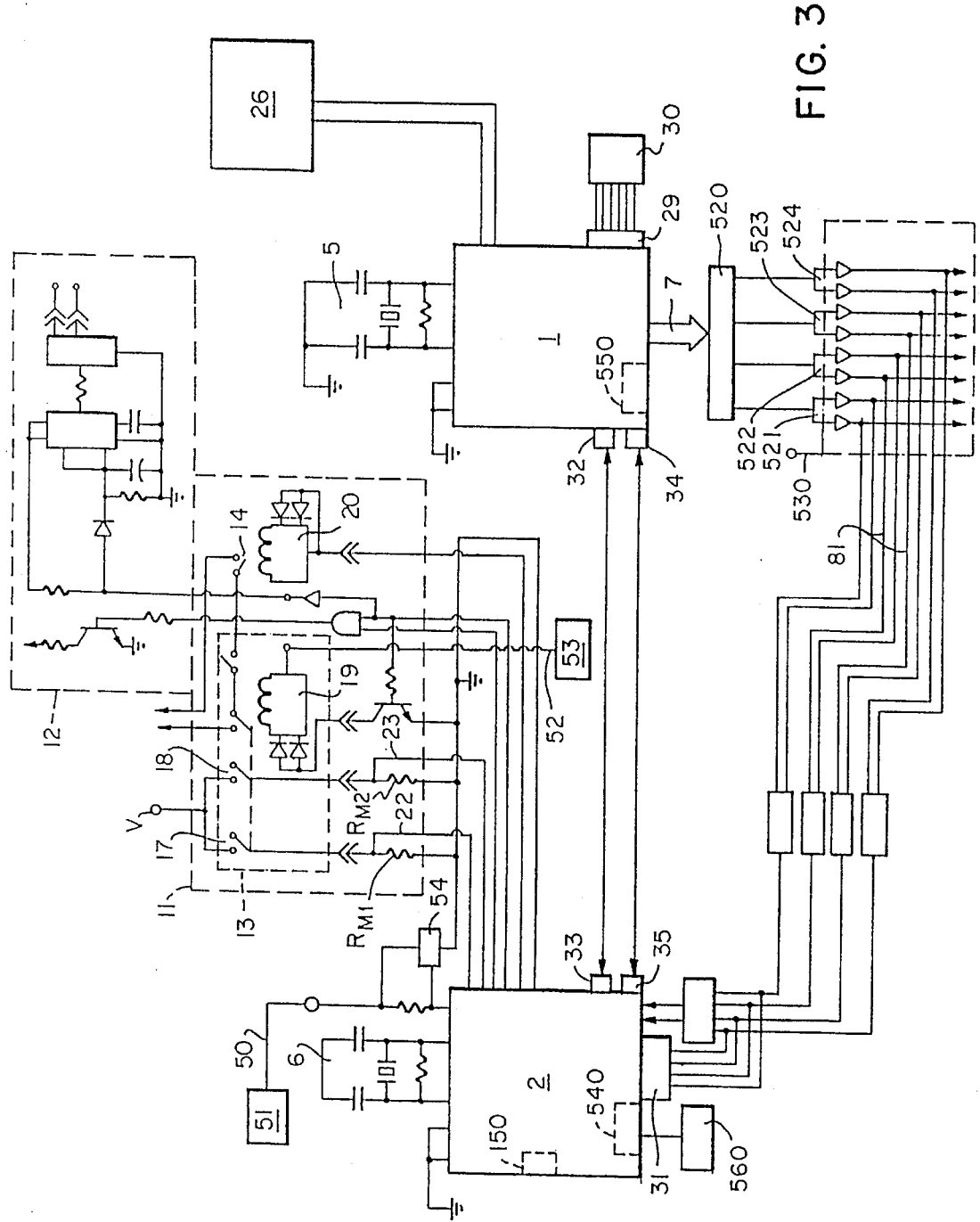
FIG. 3 is a schematic diagram of the present invention.

The general layout of said control circuit 21 of the preferred embodiment of the present invention can be understood through reference to the schematic depicted in FIGS. 2 and 3. The heart of the invention comprises a programmed SYSTEM microcontroller 1 and a programmed WATCHDOG microcontroller 2. The preferred embodiment uses a 68HC811E2 microcontroller as the foundation of said SYSTEM microcontroller 1 and a 68HC711E2 microcontroller as the foundation of said WATCHDOG microcontroller 2. Said SYSTEM microcontroller 1 through its internal programming controls the scanning of said photosource array 3 and of said photodetector array 4 while also handling the analogue-to-digital conversion of the electrical output from said photodetectors 110. Multiplexer means are used to first distribute a source pulse train 7 sequentially among said photosources 109. Demultiplexer means are used to convert the output of said photodetector array 4 into a detector pulse series 8. Said WATCHDOG microcontroller 2 performs diagnostic and self-check functions in conjunction with said SYSTEM microcontroller 1, utilizing its own internal program. Said SYSTEM microcontroller 1 is triggered and otherwise regulated by system crystal 5, whereas WATCHDOG microcontroller 2 is similarly triggered and otherwise regulated by watchdog crystal 6. Said system crystal 5 sets and controls a SYSTEM clock 9 within said SYSTEM microcontroller 1 and is completely independent from said watchdog crystal 6, which sets and controls a WATCHDOG clock 10 within said WATCHDOG microcontroller 2. In the preferred embodiment said system crystal 5 and said watchdog crystal 6 both utilize 8-MHz SRMP49 crystals.

Upon power-up, said SYSTEM clock 9 and said WATCHDOG clock 10 are set to zero, so as to ensure synchronization of said SYSTEM microcontroller 1 with said WATCHDOG microcontroller 2 during subsequent operations. At that point a start-up "self-check" mode is initialized by said SYSTEM microcontroller 1 and said WATCHDOG microcontroller 2. Said self-check mode begins with the deactivation of an Output Control Device 11.

Output Control Device

Figure 4:
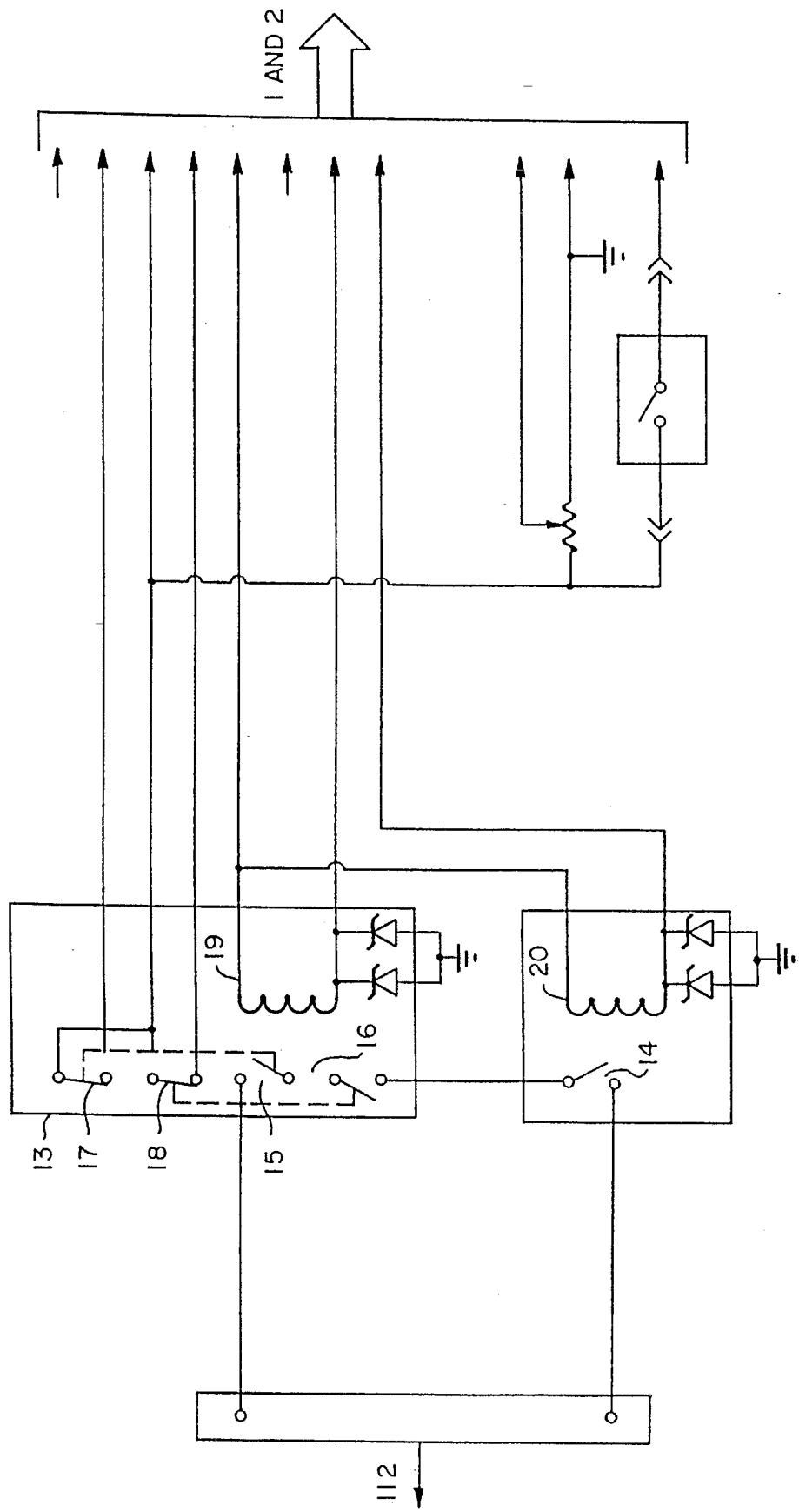
FIG. 4 is a detailed schematic diagram of the output control device of the present invention.

Said Output Control Device 11 can be understood through reference to FIG. 3 in conjunction with FIG. 2. FIG. 3 shows said output control device 11 wired into said machine-stopping current loop 12. Said output control device 11 includes a compound primary relay 13 and a backup relay 14 wired in series with one another and with the rest of said machine-stopping current loop 12. Alternatively, said compound primary relay 13 and said backup relay 14 may be separately coupled to said machine-stopping current loop 12 to further provide redundancy and isolation. FIG. 4 depicts said compound primary relay 13, which comprises a first relay 15, a second relay 16, a first dummy relay 17 and a second dummy relay 18. Both said first relay 15 and said second relay 16 are normally "open." To be closed they require the energizing of a primary relay solenoid 19. Said first dummy relay 17 and said second dummy relay 18 are normally closed. Said first relay 15 is wired in series with said second relay 16. Said first relay 15 is mechanically coupled to said first dummy relay 17 so that when said first relay 15 opens, said first dummy relay 17 is forced closed and when said first relay 15 closes, said first dummy relay 17 is forced open. An identical mechanical coupling exists between said second relay 16 and said second dummy relay 18. As the result of this mechanical coupling, for example, said first dummy relay 17 opens only when said first relay 15 actually closes and vice versa. Should said first relay 15 weld shut so that it remains closed even when said primary relay solenoid 19 is de-energized, said first dummy relay 17 will remain open. Said second relay 16 and said second dummy relay 18 operate in the same manner, although in a mutually exclusive way, as previously described.

The remainder of said output control device comprises said backup relay 14, which is controlled by a backup relay solenoid 20.

Referring back to FIG. 3, it can be seen that said compound primary relay 13 is wired into the rest of said control circuit 21 in two ways. First of all, said primary relay solenoid 19 is energized and de-energized by said control circuit 21, and similarly for said backup relay solenoid 20. In addition, said control circuit 21 is connected to said first dummy relay 17 and said second dummy relay 18 for monitoring purposes to be set out in more detail below. In contrast, note that there is no electrical connection between said control circuit 21 and said first relay 15, said second relay 16, or said backup relay 14, all of which are wired in series in a circuit completely separate from said control circuit 21, namely said machine-stopping current loop 12. (In operation, said machine-stopping current loop 12 must be completed through connection to a loop external to the present invention, a loop tied into a machine-stopping mechanism depending for its activation on the interruption in continuity of said machine-stopping current loop 12, such as is provided by the opening of said first relay 15, said second relay 16, or said backup relay 14.)

During normal operation, said primary relay solenoid 19 will be energized causing both said first relay 15 and said second relay 16 to be closed. In addition, said backup relay solenoid 20 will be energized, causing said backup relay 14 to be closed. This ensures continuity in that part of said current loop 12 and permits the operation of any machine properly interfaced with said current loop 12. This would include the possibility that more than one stopping mechanism, such as redundant stopping components associated with said machine 200, wherein each of said relays could be wired to each of the plurality of stopping mechanisms.

During normal operation, the control output signal generated by said control circuit 21 consists of a simple de-energizing of said primary relay solenoid 19, which results in the opening of said first relay 15 and said second relay 16. Note in particular that said relay solenoid 20 continues to be energized. In this way fatigue of said backup relay 14 is minimized in comparison with that of said first relay 15 and said second relay 16. As indicated above, however, during initial startup said backup relay solenoid 20 is also de-energized, ensuring that all three relays in said current loop 12 are opened during this stage of operation.

The purpose of said first dummy relay 17 and said second dummy relay 18 is to provide a means by which said control circuit 21 can determine whether or not said first relay 15 and said second relay 16, respectively, are functioning properly. Note from FIGS. 3 and 4 that said first dummy relay 17 is in series with a resistance $R_{m1}$ and that said second dummy relay 18 is in series with a resistance $R_{m2}$. Note further that a dc voltage V is connected to one side of said first dummy relay 17 and to one side of said dummy relay 18. The voltage drop across $R_{m1}$ is monitored through a first monitor line 22 connected to said WATCHDOG microcontroller 2 and the voltage drop across $R_{m2}$ is monitored through a second monitor line 23 connected to said WATCHDOG microcontroller 2. When said first dummy relay 17 is open, said first monitor line 22 will sense a zero voltage and when said first dummy relay 17 is closed, said first monitor line 22 will sense a voltage of V. And similarly for said second dummy relay 18 being open and closed, respectively. In this manner, a binary signal is generated apprising said WATCHDOG microcontroller 2 of the state (open or closed) of said first relay 15 and said second relay 16. By a simple comparison query, said WATCHDOG microcontroller 2 can determine when a "wrong" state occurs, i.e., a state inconsistent with the state of said primary relay solenoid 19. When said WATCHDOG microcontroller 2 and/or said system microcontroller 1 discovers such an inconsistency, it de-energizes said backup relay solenoid 20, as well as ensuring that said primary relay solenoid 19 is de-energized. Furthermore, it internally "latches" both said backup relay solenoid 20 and said primary relay solenoid 19 so that they cannot be re-energized until the problem with said compound primary relay 13 has been resolved. Of course, it is to be understood that relay failure is defined as a lack of response by a relay within a predefined period of time.

Note that the monitoring method described here is only one of many such monitoring schemes when one is dealing with a system coupled mechanically but not electrically to relays of an output control device. The essence of the monitoring disclosed by the present invention is that it is done in such a way as to avoid any electrical connection to the machine-stopping sub-circuit. In addition, it is a key aspect of the output control device of the present invention that the backup part of the device is connected in such a way as to minimize its fatigue during normal operations. Said output control device 11 of the preferred embodiment may incorporate readily available components, using, for example, an "H-462 Safety Relay" for said compound primary relay 13. Additionally, further redundancy may be incorporated into the operation of said output control device 11 by wiring, in series, one contact of said first relay 15 with a contact of said second relay 16. This is particularly useful for multiple-stop devices in that advantage can be taken of inherent delay times associated with such electromechanical components, due to coil response lags, armature stiffness, etc. Specifically, with this wiring configuration, the two relays will not respond simultaneously upon energizing of said primary relay solenoid 19. Therefore, the last contact to be engaged will take essentially all of the electrical load supplied by said primary relay solenoid 19. As a result, the last contact will arc most often and will most likely fail first, leaving the other primary relay operational. The possibility that both said first relay 15 and said second relay 16 will weld shut simultaneously is reduced significantly. Upon "failure" of a single contact of either primary relay, the other primary relay can provide the stop signal to said machine-stopping current loop 12.

Power Supply

In order to ensure rapid and reliable opening of said output control device 11, a separate circuit power supply line 50 delivers power from a circuit supply source 51 to said control circuit 21, and an isolated output control power supply line 52 delivers power from a control supply source 53 to said primary relay solenoid 19. In this way, noise resulting from the energization of said primary relay solenoid 19 will not affect said control circuit 21. Furthermore, an over-voltage detection circuit 54 and under-voltage detectors 55 operate to minimize fluctuation effects. First, said over-voltage detection circuit 54 detects voltage spikes in said circuit power supply line 50 and directs voltage to ground. In this way, voltage surges are directed away from said control circuit 21. Next, said under-voltage detectors 55 detect voltage reductions and reset said SYSTEM microcontroller 1 and said WATCHDOG microcontroller 2. Through this resetting said primary relay 13 and said backup relay 14 are deactivated.

Array Shielding

As part of the reliability and effectiveness of the present invention, said photosource array 3 and said photodetector array 4 are isolated from ambient radio frequency and electromagnetic interference. This is achieved in the present invention through several techniques. First, said arrays 3 and 4 are made of aluminum. Next, window portions 115 of said photosources 109 and said photodetectors 110 are coated with an infrared-transparent conductive material. Further, shielded drain wires 116 and 117 conduct interferences from said photosource cable 106 and said photodetector cable 107 respectively.

Additional protection of said photosources 109 and said photodetectors 110 involves gasket-sealing them with a NEMA #4-rated gasket, or equivalent. Connector pins 121 of said arrays 3 and 4 are preferably fabricated in one piece and O-ring sealed. An external protective covering 122 on both said photosource cable 106 and said photodetector cable 107 is made of a liquid-tight material.

Error Register and Response

As part of the built-in flexibility of the present invention, an error register and response capability is designed into the relationship between said SYSTEM microcontroller 1, said WATCHDOG microcontroller 2, and said output control device 11. In particular, said WATCHDOG microcontroller 2 receives said source pulse train 7 from said SYSTEM microcontroller 1 as said SYSTEM microcontroller 1 transmit said source pulse train 7 to said photosource array 3. If said WATCHDOG microcontroller 2 discovers a discrepancy in the signals from said plurality of detector pulses 81 when compared with the signals transmitted via said source pulse train 7, it indexes a WATCHDOG fault register 560. Should said WATCHDOG fault register 560 reach a preset threshold number, which for the preferred embodiment is 200 μsec×255, it will send a timeout-latchout signal to both said primary relay 13 and said backup relay 14. If said WATCHDOG fault register 560 does not reach the threshold number during the set time period, said WATCHDOG microcontroller 2 resets said fault register 560 to zero and the process begins again. In this way, random electrical transient spikes will not result in machinery shutdown caused by an overly sensitive evaluation process.

Internal Calibration

If necessary, either the source signal to any one of said photosources 109 may be modified, or, the threshold level at which any one of said photodetectors 110 responds to the stimulus from its corresponding photosource may be changed in order to accommodate machine use variations. Such modifications are made at the level of said SYSTEM microcontroller 1 and said WATCHDOG microcontroller 2, as described in the SUMMARY, and must be made without adjusting the gain on said photodetector array 4.

THE SELF-CHECK

Hardware Checks

Hardware Mismatch

The next task of said SYSTEM microcontroller 1 and said WATCHDOG microcontroller 2 during startup mode is to check the hardware to make sure that said control circuit 21 matches said photosource array 3 and said photodetector array 4. Because of the modular nature of many components of said light curtain system 101 it is possible to set said photosource array 3 so as to activate a number of sources s which is anything up to the total number of sources on said photosource array 3. It is possible to do the equivalent for said photodetector array 4. Similarly, said control circuit 21 can be set to control a wide-ranging number of source/ detector pairs. Consequently, the internal checking program must start out verifying that these three numbers are identical. This verification begins when said SYSTEM microcontroller 1 elicits through the first six terminals of a SYSTEM Port E 29 data signals from a parallel six dip switch port 30 of said control circuit 21 a six-digit binary number indicative of the dip switch number p of source/ detector pairs said control circuit 21 has been preset to operate. Said dip switch number p is then stored in a register of said SYSTEM microcontroller 1. Next said WATCHDOG microcontroller 2 polls (through a WATCHDOG Port E 31) from said photosource array 3 and said photodetector array 4 the source number s and the detector number d. Then said WATCHDOG microcontroller compares said source number s and said detector number d and, it they are found to be equal, said WATCHDOG microcontroller 2 sends that number to said SYSTEM microcontroller 1 via one of the lines in SYSTEM Port A 32 and WATCHDOG Port A 33 and SYSTEM Port D 34 and WATCHDOG Port D 35 linking said SYSTEM microcontroller 1 and said WATCHDOG microcontroller 2. Concurrently, said WATCHDOG microcontroller 2 elicits from said SYSTEM microcontroller 1 said dip switch number p. At this point, both said SYSTEM microcontroller 1 and said WATCHDOG microcontroller 2 have said dip switch number p and said detector number d found to be equal to said source number s by said WATCHDOG microcontroller 2. Each microcontroller then makes an independent comparison of said dip switch number p and said detector number d (found to equal said source number s). If both microcontrollers find the two numbers in the final comparison to equal one another, the hardware verification check is deemed satisfied and said control circuit 21 moves on to the next check. On the other hand, if any of the three number comparisons shows an inequality, said WATCHDOG microcontroller 2 latches out said compound primary relay 13 and said backup relay 14 and sends an explanatory error message ("sensor number mismatch") to the operator via a liquid crystal display 26, which in the preferred embodiment of the invention is a microcontroller 2040A Display Unit, and said SYSTEM microcontroller 1 is disabled.

Alignment Check

The next phase of the "self-check" is the alignment check, which as with the Hardware Verification Check is carried out with said primary relay 13 and said backup relay 14 both deactivated (open). Much of the technique used during the alignment check is also followed during subsequent operation of the light curtain. The purpose of the alignment check is to determine that light from each LED of said photosource array 3 illuminates the correct detector (its matching member) of said photodetector array 4. Signals from said photodetector array 4 are transmitted in the form of voltage to a detector voltage-to-current converter 24. This enables the signal from said photodetector array 4 to be transmitted over long cables to said control circuit 21 without reducing the signal-to-noise ratio by nearly the degree that a voltage signal would be degraded. At said control circuit 21, said current signal is converted to a voltage signal by a current-to-voltage converter 25 and then conveyed to said SYSTEM microcontroller 1 for verification. The signal emerging from said photodetector array 4 comprises a plurality of detector pulses 81 corresponding to each of the individual detectors of said photodetector array 4 being illuminated in sequence. Said plurality of detector pulses 81 is demultiplexed into said pulse detector series 8. It is the task of said SYSTEM microcontroller 1 in this alignment check to verify that said detector pulse series 8 comprises a series of equally spaced pulses, of particular period. If said SYSTEM microcontroller 1 verifies this, the alignment check is deemed complete and the next self-check is conducted. (If the alignment check is failed, said primary relay 13 and said backup relay 14 are latched out and an error message sent to the operator of the light curtain via said liquid crystal display 26.

Output Control Device Check

Said SYSTEM microcontroller 1 and said WATCHDOG microcontroller 2 check said output control device 11 during the startup procedure and then after every actuation of said output control device 11 during operation. In the preferred embodiment of the present invention said output control device 11 is the combination of said compound primary relay 13 and said backup relay 14 and "actuation" consists of energizing said primary relay solenoid 19 with said back relay solenoid 20 already energized. This check is performed using the monitoring scheme set out above in the discussion of said output control device 11. During startup, said output control device 11 must pass this check before the startup procedure can advance.

Code Verification Checks

Figure 5:
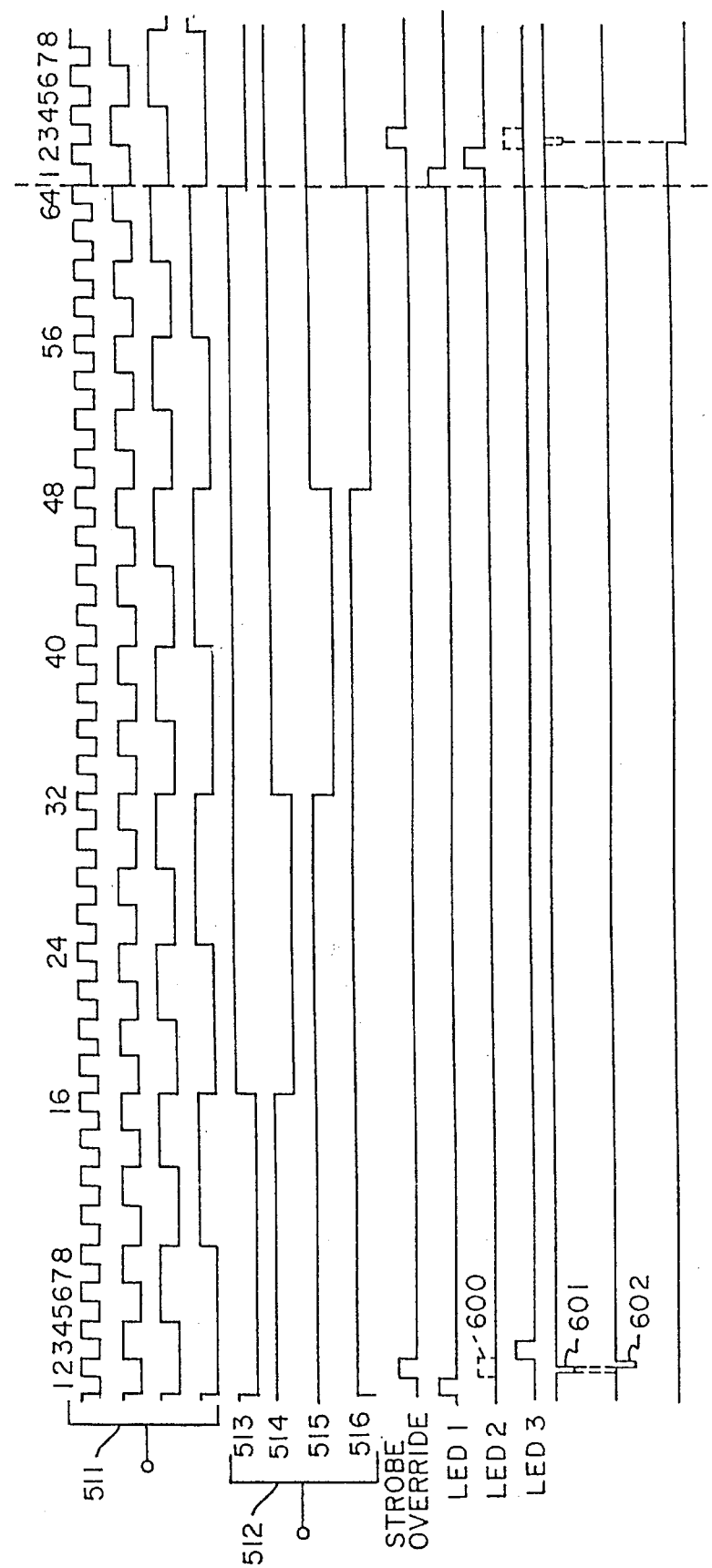
FIG. 5 is a pulse diagram of an exemplar of the operation of the light switch of the present invention.

During normal operation said SYSTEM microcontroller 1 generates said source code 7 and transmits it over said source array cable 106 to said photosource array 3 containing a plurality of multiplexers 520. The complex of said source code 7 can be best understood with reference to FIGS. 3 and 5, which relates to the preferred embodiment and assumes said plurality of multiplexers to be four in number comprising a first multiplexer 521, a second multiplexer 522, a third multiplexer 523, and a fourth multiplexer 524. Each of said plurality of multiplexers 520 controls sixteen of said plurality of photosources 109. At all times during normal operation each of said plurality of photosources is connected to a 5-volt dc line 530 coming from said control circuit 21. Only for those of said plurality of photosources 109 which are activated, however, does said 5-volt dc line 530 result in current flow and light production.

Said source code 7 is transmitted to said photosource array 3 over said source array cable 106, which has eight lines, broken into a first source group 511 of four and a second source group 512 of four. Said first source group 511 enables a parallel transmission of a four-digit binary number ranging repetitively from 0000 (0) to 1111 (15). Said second source group 512 carries an individual line to each of said plurality of multiplexers 520. It is said second group 512 which determines which of said plurality of multiplexers 520 is activated. In the preferred embodiment, a "low" signal applied to one of said plurality of multiplexers 520 activates it. Said second source group 512 comprises a Strobe 1 line 513, a Strobe 2 line 514, a Strobe 3 515, and a Strobe 4 line 516, each of which runs to a different one of said plurality of multiplexers 520. Thus when said Strobe 1 line 513 is low while said Strobe 2 line 514, said Strobe 3 line 515, and said Strobe 4 line 516 are all high, a first multiplexer 521 and no other of the four multiplexers in said plurality of multiplexers 520, is activated. Said first multiplexer 521 controls the activation of a first group of sixteen LEDs 525 in the preferred embodiment. The cycling of the code on said first group 525 then controls said first multiplexer 521 in such a way as to cause said first multiplexer 521 to activate in turn each of said first group of sixteen LEDs 525. And similarly for the remainder of said plurality of multiplexers 520. For example, said second multiplexer 522 controls a second group of sixteen LEDs 526, and so on.

Said WATCHDOG microcontroller 2 also receives said source code 7 from said SYSTEM microcontroller 1, and compares it, especially the signals on said first group 525 with a WATCHDOG signal register 540. There is also a SYSTEM signal register 550, which along with said WATCHDOG signal register 540, is set to zero initially and then indexed by unity each cycle. Said SYSTEM signal register 550 determines the code number to be transmitted. As previously noted in the discussion of the Error Register and Response section, if said WATCHDOG microcontroller 2 discovers a discrepancy between the four bit binary number received from said SYSTEM microcontroller 1 and said WATCHDOG signal register 540, it indexes said WATCHDOG fault register 560. Should said WATCHDOG fault register 540 reach the preset threshold number within 200 µsec×255, it will send a timeout, latchout signal to both said primary relay 13 and said backup relay 14. If said WATCHDOG fault register 560 does not reach the threshold number, said WATCHDOG microcontroller 2 resets said fault register and the process begins again.

Data Transmission and Processing Checks

Within said SYSTEM microcontroller 1 and said WATCHDOG microcontroller 2 data transmission and evaluation checks are performed. These checks verify the proper flow of information and processing of that information. In the preferred embodiment of the present invention, a WATCHDOG timer 150 records time intervals of 200 microseconds at a 5000 Hz frequency. If, during startup, said WATCHDOG microcontroller 2 fails to receive predetermined signals from said SYSTEM microcontroller 1, said WATCHDOG microcontroller 1 cancels the startup process and sends an error message to a machine operator via said display 26. If predetermined signals are not received during operation, said WATCHDOG microcontroller 2 relays a message to said primary relay 13 and said backup relay 14, within 20 milliseconds of detection, to open.

Complete System Integrity Checks

In order to verify that said light curtain system 101 is operating as expected, said WATCHDOG microcontroller 2 periodically conducts a system check whereby it sends a simulated blockage signal 600 directly to one of said photosources 109. Said SYSTEM microcontroller 1 is not notified of this simulation and proceeds to transmit a fault signal 601 to both said output control device 11 and said WATCHDOG microcontroller 2 upon evaluation of each of said plurality of detector pulses 81 from said pulse detector series 8. Said WATCHDOG microcontroller 2 first verifies that the appropriate fault signal 601 has been transmitted by said SYSTEM microcontroller 1 and then transmits a fault override signal 602 directly to said output control device 11. Since the rate at which said fault override signal 602 proceeds is much faster than the rate at which said output control device 11 is activated, operation of said machine 200 proceeds uninterrupted. If, however, said SYSTEM microcontroller 1 fails to detect said simulated blockage signal 600, or a predetermined number of simulated signals, said WATCHDOG microcontroller 2 transmits a shutdown signal to said output control device 11, ordering it to open said primary relay 13. This novel feature of the present invention provides for continuous evaluation of the integrity of the light curtain system 101. Additional features, such as a "computer operating properly" system check, and a related clock monitoring system, both of which are standard systems available in the field, further operate to provide for a rapid, reliable means of generating a desired output signal.

Although the preferred embodiment of the present invention has been described herein, it is to be understood that the above description is merely illustrative. Other means and methods may be substituted for particular features and processes without deviating from a rapid, reliable output control system as described herein. Such other means include the use of any suitable microprocessing system capable of handling the data involved and the output required, a system that does not specifically have the two separate microcontrollers described in this preferred embodiment. Accordingly, it is to be understood that the present invention is not limited to that precisely shown and described.

We claim:

1. A compound, monitorable electromechanical relay system comprising:
  a. a primary relay with primary relay contacts;
  b. a primary solenoid connected to said primary relay so as to activate said primary relay contacts when said primary solenoid is energized, with said primary solenoid having a primary coil, wherein said primary coil is activated in a turn-off state; and
  c. a primary relay monitor circuit having a dummy relay with dummy relay contacts wherein said dummy relay is mechanically coupled to but electrically isolated from said primary relay in such a way that when said primary relay contacts are in an open state, said dummy relay contacts are in a closed state, and wherein when said primary relay contacts are in a closed state, said dummy relay contacts are in an open state, and wherein said dummy relay is connected to said primary solenoid.

2. The electromechanical relay system as claimed in claim 1 further comprising:
  a. a backup relay with backup relay contacts in said open state, wherein said backup relay contacts are connected with said primary relay contacts; and
  b. a backup solenoid coupled to said backup relay so as to move said backup replay contacts from said open state to said closed state when said backup solenoid is energized.

3. The electromechanical relay system as claimed in claim 1 with said primary solenoid having a primary coil, wherein said primary coil is activated in a turn-on state.

4. The electromechanical relay system as claimed in claim 1 further comprising means for monitoring failure of said primary coil.

5. The electromechanical relay system as claimed in claim 4 wherein said means for monitoring failure of said primary coil includes a SYSTEM microcontroller and a WATCHDOG microcontroller each linked to said primary solenoid, wherein when a false deactivation signal is delivered by said SYSTEM microcontroller to said primary solenoid, said WATCHDOG microcontroller evaluates a response by said primary solenoid to said false deactivation signal.

6. The electromechanical relay system as claimed in claim 1 wherein said relay system is connected to a machine so that when said primary relay contacts are activated said machine is turned off.

7. The electromechanical relay system as claimed in claim 6 wherein said machine includes a single stopping element and said primary relay contacts are connected in series with backup relay contacts of a backup relay and with said single stopping element.

8. The electromechanical relay system as claimed in claim 6 wherein said machine includes a plurality of stopping elements wherein each of said primary relay contacts is independently connected to each of said stopping elements.

9. The electromechanical relay system as claimed in claim 8 further comprising a backup relay with backup relay contacts, wherein each of said backup relay contacts is independently connected to each of said primary relay contacts.

10. The electromechanical relay system as claimed in claim 8 further comprising a backup relay with backup relay contacts, wherein each of said backup relay contacts is independently connected to each of said stopping elements.

11. The electromechanical relay system as claimed in claim 2 wherein said backup relay contacts are connected in series with said primary relay contacts.

12. The electromechanical relay system as claimed in claim 2 wherein said backup relay is preserved by not actuating said backup relay until a failure in said primary relay occurs.

13. A process for ensuring that failure of an electromechanical relay occurs in a safe manner, comprising the steps of:
  a. utilizing dummy relay contacts mechanically coupled to primary relay contacts and electrically wired in series with a dummy resistor to monitor the status of said primary relay contacts of said electromechanical relay;
  b. connecting backup relay contacts of a backup relay in series with said primary relay contacts;
  c. measuring the voltage across said dummy resistor;
  d. comparing the voltage across said dummy resistor with the energization state of a primary solenoid of said electromechanical relay;
  e. determining whether the voltage across said dummy resistor corresponds with a specific energization state of said primary solenoid; and
  f. changing the energization state of said primary solenoid so as to cause said primary contacts to open, and changing the energization state of a backup solenoid so as to cause said backup relay contacts to open upon determining that the voltage across said dummy resistor does not correspond with the particular energization state of said primary solenoid.

14. The process as claimed in claim 13 wherein the step of changing the energization state is achieved within 20 milliseconds of determining that said inconsistency does exist.

15. The process as claimed in claim 13 further comprising the step of monitoring for electric coil failure.

16. The process as claimed in claim 15 wherein said monitoring for electric coil failure is carried out by:
  a. a System microcontroller, wherein said System microcontroller is programmed to run relay functions; and, b. monitoring means for detecting relay electric coil failure, said monitoring means including a Watchdog microcontroller, wherein said Watchdog microcontroller is programmed to send a false blockage signal and wherein said Watchdog microcontroller monitors and responds to said functions initiated by said System microcontroller and to take over said functions.

17. In conjunction with an electronic circuit capable of generating a first output control signal and a second output control signal, a compound, monitorable electromechanical relay comprising:

a. a first relay having a primary solenoid and with contacts normally open;

b. a first dummy relay mechanically coupled to but electrically isolated from said first relay and connected to said primary solenoid;

c. a first-relay monitoring means for determining whether said first dummy relay is open or closed and for generating a first dual-mode signal which is low when the resistance across said first dummy relay is high and high when the resistance across said first dummy relay is low;

d. a second relay with contacts normally open;

e. a second dummy relay mechanically coupled to but electrically isolated from said second relay;

f. a second-relay monitoring means for determining whether said second dummy relay is open or closed and for generating a second dual-mode signal which is low when the resistance across said second dummy relay is high and high when the resistance across said second dummy relay is low;

g. a third relay with contacts normally open; and h. a control circuit means for delivering said first output control signal to said first relay and to said second relay, for eliciting said first dual-mode signal and said second dual-mode signal, and for delivering said second output control signal to said first relay, said second relay, and said third relay, wherein said first relay and said second relay are wired in series with one another and with said third relay, wherein said control circuit is connected so that said first output control signal deactivates said first relay and said second relay, and said second output control signal deactivates and latches open the contacts of said first relay, said second relay, and said third relay, and wherein both said first-relay monitoring means and said second-relay monitoring means are configured so as to invoke, when a certain critical event occurs, said second control signal from said electronic circuit.

18. The device as claimed in claim 17 wherein said critical event for said first-relay monitoring means comprises either said first resistance being low while said first control signal is present or high when said first control signal is absent, and wherein said critical event for said second-relay monitoring means comprises either said second resistance being low while said first control signal is present or high when said first control signal is absent.

19. The device as claimed in claim 17 wherein said electronic circuit is a light-curtain control circuit.

20. A process for stopping the operation of a machine upon the detection of an object in close proximity to said machine, said process comprising the steps of:

a. linking said machine to an electromechanical relay system comprising:

i. a primary relay system having primary relay contacts, wherein said primary relay system is connected to a primary solenoid;

ii. a dummy relay having dummy relay contacts and connected to said primary solenoid, wherein said dummy relay contacts are mechanically coupled to but electrically isolated from said primary relay contacts in such a way that when said primary relay contacts are in a first state, said dummy relay contacts are in a second state, and wherein when said primary relay contacts are in said second state, said dummy relay contacts are in said first state; and iii. a backup relay system having backup relay contacts connected to said primary relay system and to said machine; and b. providing a stop-motion signal from said primary relay contacts to said machine when said object is detected.

21. The process as claimed in claim 20 further comprising the step of providing said stop-motion signal from said backup relay contacts to said machine when said object is detected and when said primary relay contacts fail.

22. The process as claimed in claim 20 further comprising the step of providing said stop-motion signal from said backup relay contacts to said machine when said object is detected and when said primary solenoid fails.

23. A relay fault detection system comprising:

a. a compound, monitorable electromechanical relay system;

b. a System microcontroller, wherein said System microcontroller is programmed to run relay functions; and, c. monitoring means for detecting relay electric coil failure, said monitoring means including a Watchdog microcontroller, wherein said Watchdog microcontroller is programmed to send a false blockage signal and wherein said Watchdog microcontroller is programmed to monitor and respond to said functions initiated by said System microcontroller and to take over said functions.

* * * * *